United States Patent
Havemose

(10) Patent No.: US 6,842,894 B1
(45) Date of Patent: Jan. 11, 2005

(54) DYNAMIC COMPILING

(75) Inventor: Allan Havemose, San Jose, CA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/542,714

(22) Filed: Apr. 4, 2000

Related U.S. Application Data

(63) Continuation-in-part of application No. 09/312,123, filed on May 14, 1999, now Pat. No. 6,757,903.
(60) Provisional application No. 60/127,767, filed on Apr. 5, 1999.

(51) Int. Cl.$^7$ .............................................. G06F 9/45
(52) U.S. Cl. .................................................... 717/148
(58) Field of Search ............................... 717/140–162; 707/2, 8, 102, 103 Y, 104.1; 709/105, 247, 331; 705/21, 30, 35

(56) References Cited

U.S. PATENT DOCUMENTS

| | | | | |
|---|---|---|---|---|
| 5,230,050 A | * | 7/1993 | Iitsuka et al. ............... | 717/145 |
| 5,848,274 A | * | 12/1998 | Hamby et al. .............. | 717/153 |
| 5,920,720 A | * | 7/1999 | Toutonghi et al. .......... | 717/148 |
| 5,987,256 A | * | 11/1999 | Wu et al. ................... | 717/146 |
| 6,044,220 A | * | 3/2000 | Breternitz, Jr. ............. | 717/139 |
| 6,151,703 A | * | 11/2000 | Crelier ....................... | 717/136 |
| 6,186,677 B1 | * | 2/2001 | Angel et al. ................ | 717/118 |
| 6,295,641 B1 | * | 9/2001 | Beadle et al. .............. | 717/148 |
| 6,295,642 B1 | * | 9/2001 | Blandy ....................... | 717/148 |
| 6,305,012 B1 | * | 10/2001 | Beadle et al. .............. | 717/148 |
| 6,308,320 B1 | * | 10/2001 | Burch ........................ | 717/154 |
| 6,311,165 B1 | * | 10/2001 | Coutts et al. ................ | 705/21 |
| 6,530,075 B1 | * | 3/2003 | Beadle et al. .............. | 717/114 |

* cited by examiner

*Primary Examiner*—Tuan A Vu
(74) *Attorney, Agent, or Firm*—Jeff Anderson Suiter-West

(57) ABSTRACT

The present invention provides a novel execution environment for optimizing the efficiency of the distributed object system. In one embodiment, the invention includes a compiler with ability to interpret, just-in-time compile or pre-compile any object of the distributed object system. An object is provided in a tagged file format that allows a compiler to identify critical sections of the object code for immediate one-time compiles while delaying compiling of the non-tagged, non-critical code until actually required by the system. The object code includes at least one dynamic base object which includes an interface dynamic base object and a implementation base object. The implementation dynamic base object fulfills the object system requested tasks transmitted over by the interface dynamic base object via a message bus.

43 Claims, 12 Drawing Sheets

DYNAMIC COMPILING

CROSS REFERENCE TO RELATED APPLICATIONS

The present invention claims the benefit under 35 U.S.C. §119(e) of U.S. Provisional Patent Application Ser. No. 60/127,767 filed on Apr. 5, 1999. Said U.S. Provisional Application No. 60/127,767 is herein incorporated by reference in its entirety. The present application also claims the benefit under 35 U.S.C. §120 of U.S. patent application Ser. No. 09/312,123, filed May 14, 1999, of which the present invention is continuation-in-part and now issued as U.S. Pat. No. 6,757,903. Said U.S. application Ser. No. 09/312,123 is herein incorporated by reference in its entirety. The present invention also incorporates the following United States patent applications by reference in their entirety: Ser. No. 09/542,559, filed Apr. 4, 2000, now allowed and pending publication; Ser. No. 09/542,716, filed Apr. 4, 2000, now pending; Ser. No. 09/542,743, filed Apr. 4, 2000, now pending; and Ser. No. 09/542,159, filed Apr. 4, 2000, now pending.

FIELD OF THE INVENTION

The present invention relates generally to the fields of data manipulation and more particularly to a system and method of dynamic compiling.

BACKGROUND OF THE INVENTION

Methods and apparatus for transacting business over a network are old in the art. For example, telephone communications have long been utilized to transact purchases and transfer funds between accounts. Likewise, current cable and satellite television systems allow viewers to order video and audio content paid for via a viewer's credit or debit account information. Additionally, "on-line" purchases of goods and services are becoming common over the INTERNET. However, such methods and apparatus do not allow a buyer and a seller to transact business utilizing a common or universal transaction system.

Digital information appliances (DIA) are electronic devices designed to perform a specific function or group of functions more efficiently than would a conventional computer system. Like computer systems, information appliances may be interconnected with a network such as the INTERNET to provide content and functions which would not be available when the appliances operated independently. Preferably, such network connections are transparent to the user so that the complexity of the underlying computer network is masked. In this manner, information appliances provide advantages in simplicity of operation and computing ease of use to their users.

As the proliferation of digital information appliances accelerates, it will become necessary to develop a standard system architecture and operating environment to facilitate their use and interconnection with each other and other networked devices. Such a system architecture may utilize a distributed object model employing object oriented programming methods. Object oriented programming is a programming paradigm (method) wherein a program is organized as a collection of discrete objects that are self-contained collections of data structures and routines that interact with that data. Such objects encapsulate related data and procedures so as to hide that information by allowing access to the data and procedures only through the object's published interface. Hence changes to the data and or procedures of the object are isolated from other objects. This provides an architecture that is more easily maintained since changes to an object's code does not affect other objects.

Likewise, object oriented programming methods provide for inheritance of an object's characteristics into another class of object. Thus, an object may be derived from a first object to form a second object which "inherits" certain properties of its parent object. This allows for both (1) the formation of subclasses of objects having more specialized features and/or capabilities, and (2) the reuse of individual objects in different programs. Thus, libraries of proven objects may be developed which may be used repeatedly in different applications.

In developing a standard appliance system architecture, it is desirable to allow access to objects in a transparent fashion so that objects created in different programming languages and objects residing on different appliances, network servers, or computer systems that are networked together are accessible to the user without extensive modification of the user's programming code. For computer networks, this capability may be provided by object oriented distributed environments such as the common object request broker architecture (CORBA). Such system architectures are based upon a client-server model, in which object servers provide public interfaces to object-clients that make requests of the object servers. Typically in such systems, the servers are objects consisting of data and associated methods. The object clients obtain access to the object servers by sending them messages which are mediated by the distributed system. When the server object receives the message it invokes the appropriate method and transmits the result back to the object client. The object-client and object server communicate through an Object Request Broker (ORB) which is used to locate the various distributed objects and establish communication between the objects and the client. However, such existing distributed object architectures require that all transactions (communications between client objects and server objects) must pass through an ORB. As a result, the ORB becomes a single failure point which could potentially disable such a system. Further, an ORB typically requires a large amount of memory. Thus, architectures such as CORBA would be unsuitable for "thin" (simple) appliances which have a limited amount of memory.

Consequently, it would be advantageous to develop an information appliance management system employing a standard appliance system architecture. Such an information appliance management system would provide greater fault tolerance than conventional object based architectures, and may be implemented on thin appliances having a limited amount of memory. The information appliance management system would allow management of transactions performed through information appliances.

Additionally, it may be desirable to provide a mechanism to ensure near-optimal execution performance by incorporating a dynamic "critical section" load-time compiler within the execution environment. Thus, the transfer and utilization of objects may be accomplished in a more efficient manner.

SUMMARY OF THE INVENTION

The present invention provides a novel execution environment for optimizing the efficiency of a distributed object system. In one embodiment, the invention includes a load-time compiler with ability to interpret, just-in-time compile or pre-compile any object of the distributed object system. In an exemplary embodiment utilizing an object based program environment, an object may be provided in a tagged file format allowing a load-time compiler to identify critical sections of the object code for immediate one-time compiles while delaying compiling of the non-tagged, non-critical code until actually required by the system.

In another aspect of the present invention, a method of dynamic compiling includes loading byte-code on a digital information appliance and identifying a tagged section of the byte-code. The tagged section of byte-code is compiled wherein the tagged section is compiled when the byte-code is loaded so as to enable the digital information appliance to utilize the tagged section of byte-code without additional compiling of the tagged section of byte-code by the digital information appliance.

The byte code includes at least one dynamic base object, the at least one dynamic base object having a self-checking mechanism with dynamic re-start and re-initialization upon run-time or like failure. The dynamic base object further includes a standardized communication and services interface. The at least one dynamic base object also includes an interface dynamic base object and an implementation dynamic base object that communicate with each other over a message bus. The interface dynamic base object is utilized by an application to send a message to the implementation dynamic base object to carry out a requested task. The implementation dynamic base object carries out the requested task and returns a result to the interface dynamic base object.

In a further aspect of the present invention, a system for providing an execution environment that is suitable for dynamic compiling includes a memory device suitable for storing computer readable information and a loader coupled to the memory device, the loader suitable for loading byte-code to the memory. An identifier is coupled to the loader, the identifier suitable for identifying a tagged section of the byte-code. A compiler is coupled to the identifier wherein the identified tagged section is compiled by the compiler when the byte-code is loaded so as to enable the tagged section of byte-code to be utilized without additional compiling of the tagged section of byte-code.

The byte code includes at least one dynamic base object, the at least one dynamic base object having a self-checking mechanism with dynamic re-start and re-initialization upon run-time or like failure. The dynamic base object further includes a standardized communication and services interface. The at least one dynamic base object also includes an interface dynamic base object and an implementation dynamic base object that communicate with each other over a message bus. The interface dynamic base object is utilized by an application to send a message to the implementation dynamic base object to carry out a requested task. The implementation dynamic base object carries out the requested task and returns a result to the interface dynamic base object.

It is to be understood that both the forgoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The present invention includes a system architecture and operating environment for digital information appliances (DIAs) which allows for feature and feature enhancements for digital information appliances and the like. A DIA is any electronic device capable of operating on a computer network in batch or real-time. Most DIA's include an I/O, a ROM, and a memory. DIAs include both single feature and multiple feature devices. In a preferred embodiment, DIAs operate in the network of the present environment with general purpose computers and the like (FIG. 1).

Figure 1:
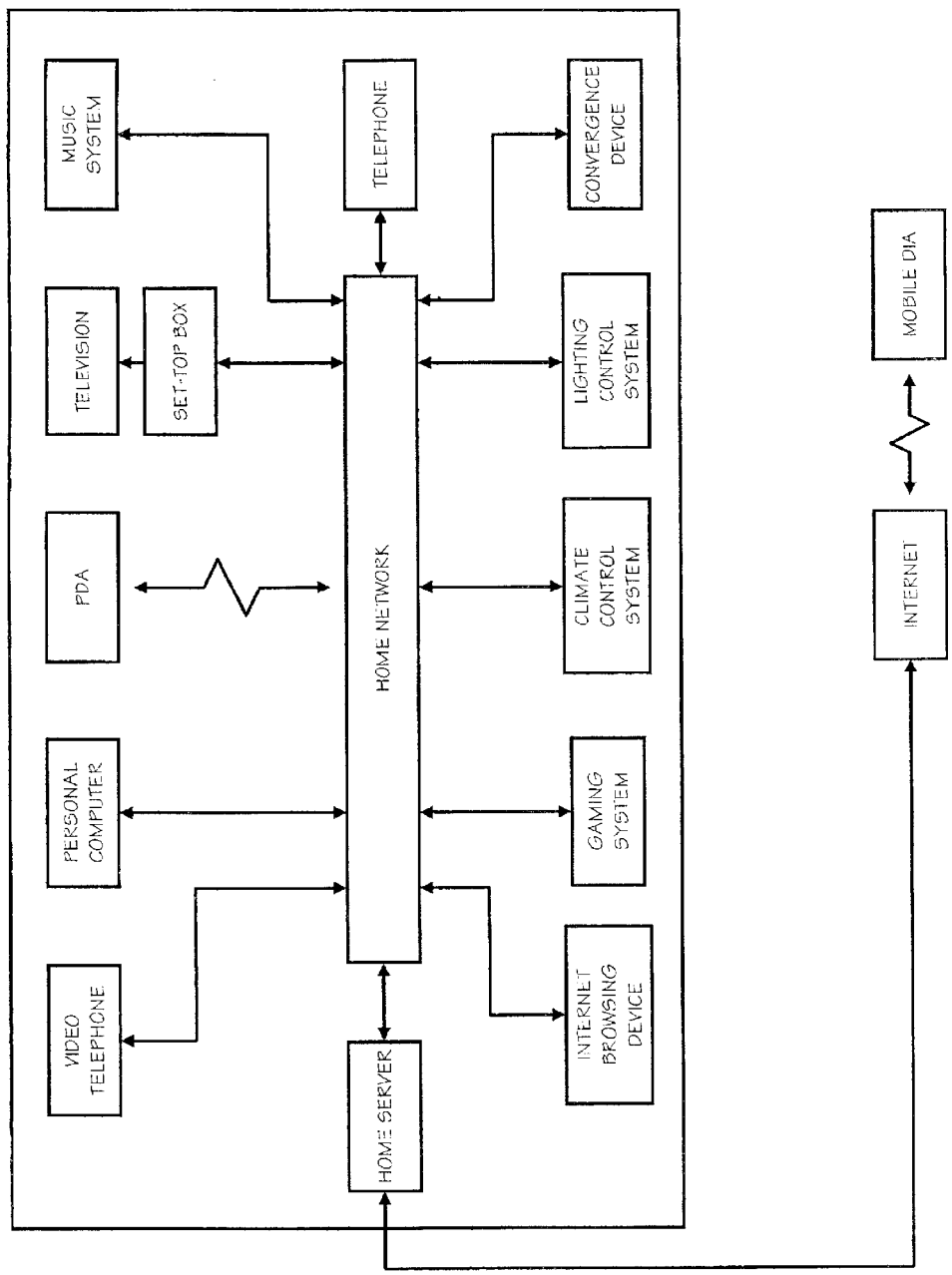
FIG. 1 is a block diagram illustrating a network of information appliances having a local and a global portion operated at least partially by the architecture of the present invention.

Referring generally now to FIGS. 1 through 10, a system architecture and operating environment for digital information appliances (DIAs) which allows for feature and feature enhancements for digital information appliances and the like is shown. A DIA is any electronic device capable of operating on a computer network in batch or real-time. Most DIA's include an I/O, a ROM, and a memory. DIAs include both single feature and multiple feature devices, such as information handling systems. In a preferred embodiment, DIAs operate in the network of the present environment with general purpose computers and the like (FIG. 1).

System Architecture and Operating Environment

To best understand the many novel and innovative features of the universal information appliance management system of the present invention, a discussion of an exemplary underlying system architecture and operating environment is in order. While the patentable features of the present system architecture and operating environment (as claimed herein) will be apparent, other object based or procedural architectures may be utilized to implement the information appliance management system of the present invention.

An object based implementation is described in the preferred embodiment, however those skilled in the art will recognize that the architecture, including a functional hierarchy and an administration function, could be implemented in a procedural implementation without departing from the spirit of the invention.

Figure 2:
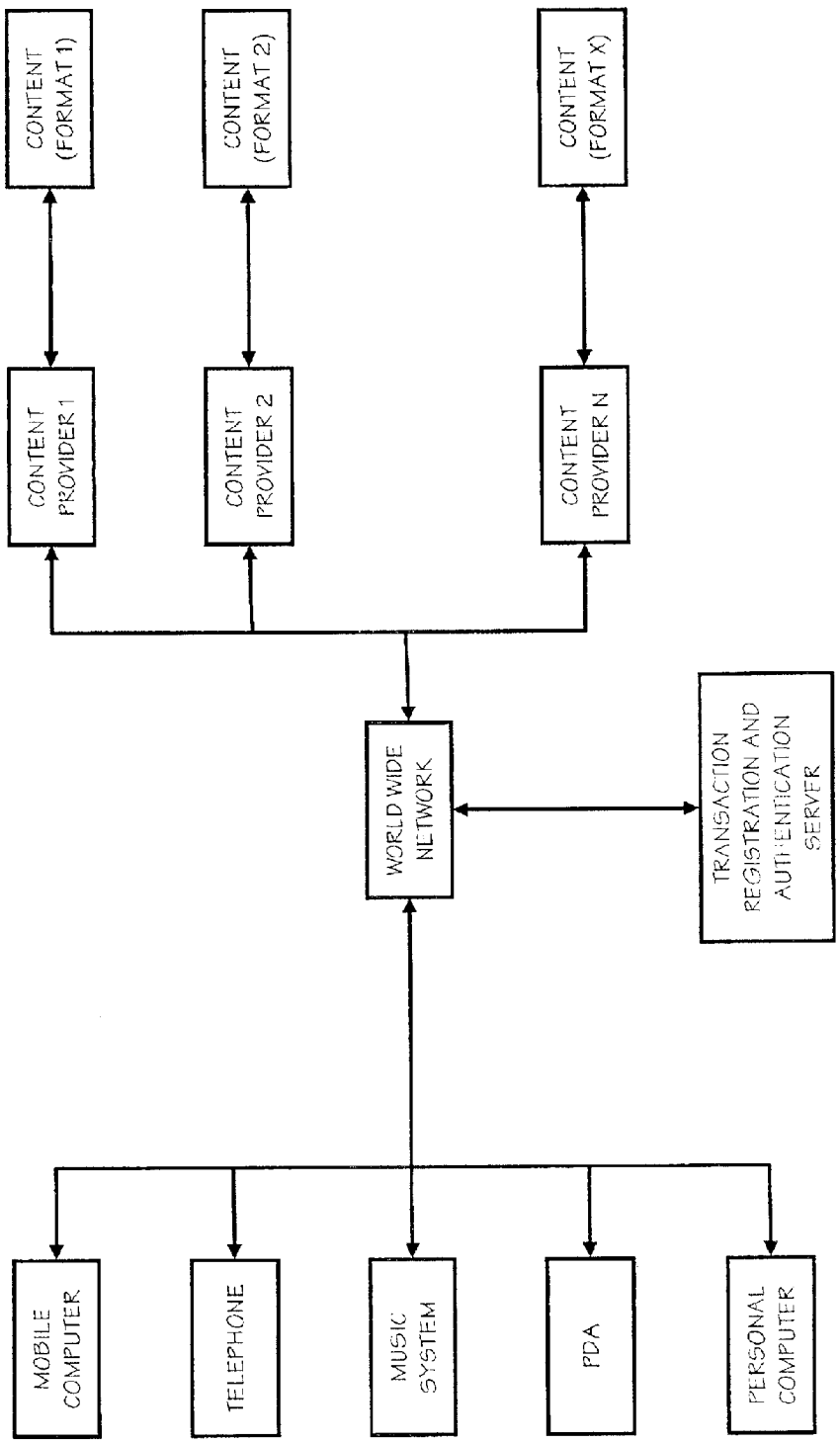
FIG. 2 is a block diagram illustrating content exchange between computers and information appliances over a network at least partially operated by the architecture of the present invention.

The system architecture and operating environment of the present invention (herein after "the architecture") includes an object hierarchy and object administrator. Together the object hierarchy and object administrator provide additional services not offered by the underlying operating system. The architecture of the present invention creates a scalable, object driven software architecture that supports both simple appliances, network computers/devices and general purpose computers such as personal computers, servers, "mainframe" computers, and "super" computers (FIG. 2).

The architecture of the present invention supports the creation of compelling and easy-to-use consumer and desktop user-interfaces. Additionally, networking within the architecture of the present invention is pervasive, i.e., resources on the network behave as local resources and execution is transportable across network boundaries.

Dynamic Base-Objects

The architecture of the present invention also enables efficient development of applications; whether work processors (e.g., word processors), video applications, games or soft appliances. The architecture of the present invention includes dynamic base-objects (DBO). Each DBO implements a defined behavior, but may in addition request and use capabilities of another DBO. DBOs may also provide services to another object such as a DBO requesting another DBO.

Figure 3:
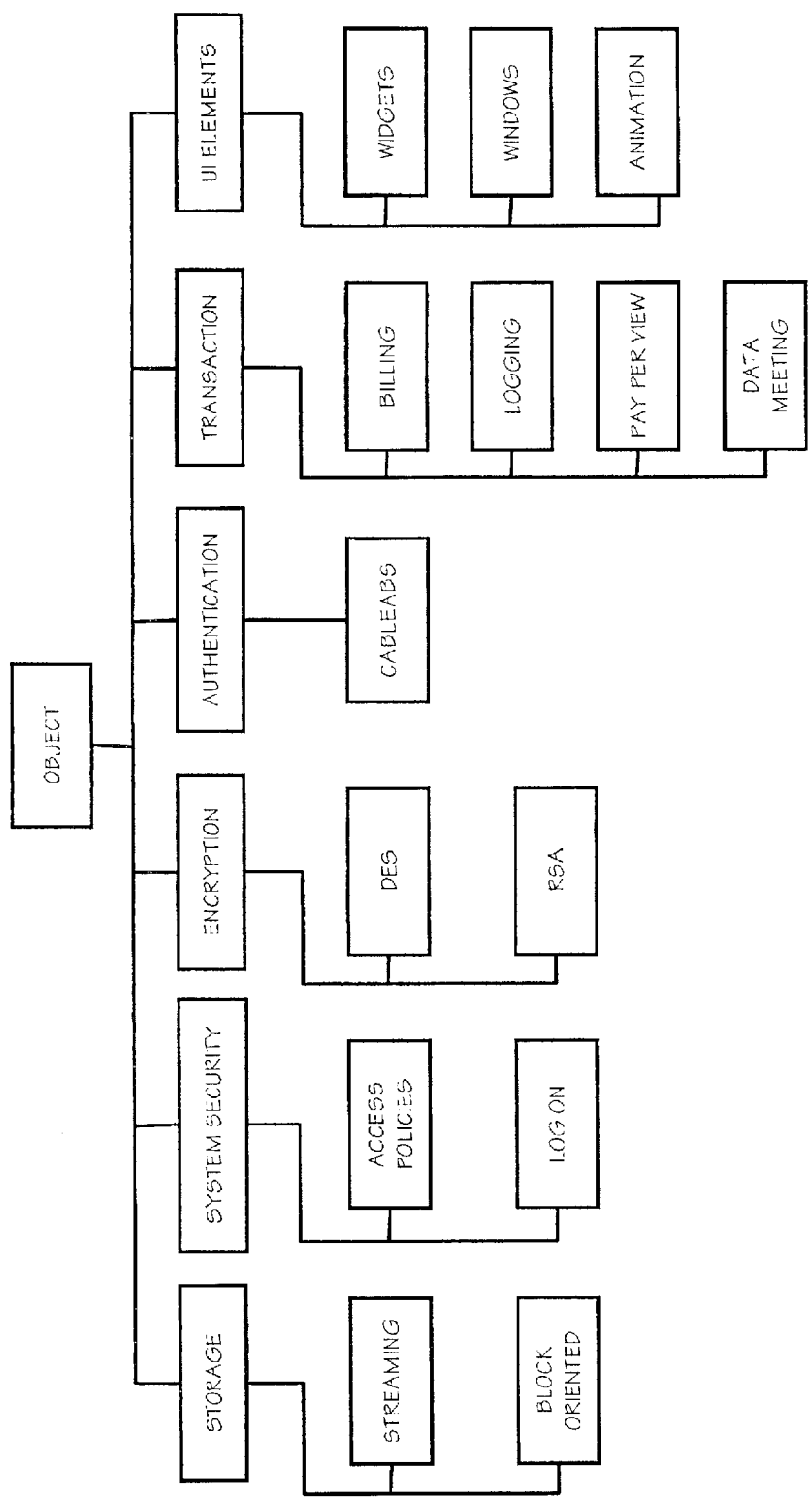
FIG. 3 is a block diagram illustrating the hierarchy of the dynamic objects which operate within the architecture of the scalable, distributed network of the present invention.

In a presently preferred embodiment of the invention a DBO may provide service routines to manage identification and communication with other DBOs. The architecture of the present invention also provides a DBO hierarchy, wherein each DBO or class within the hierarchy specializes in providing one particular type of service. A presently preferred exemplary embodiment of this hierarchy is illustrated in FIG. 3. The hierarchy of the present invention allows for features and capabilities not found in prior art object oriented programming.

Figure 4:
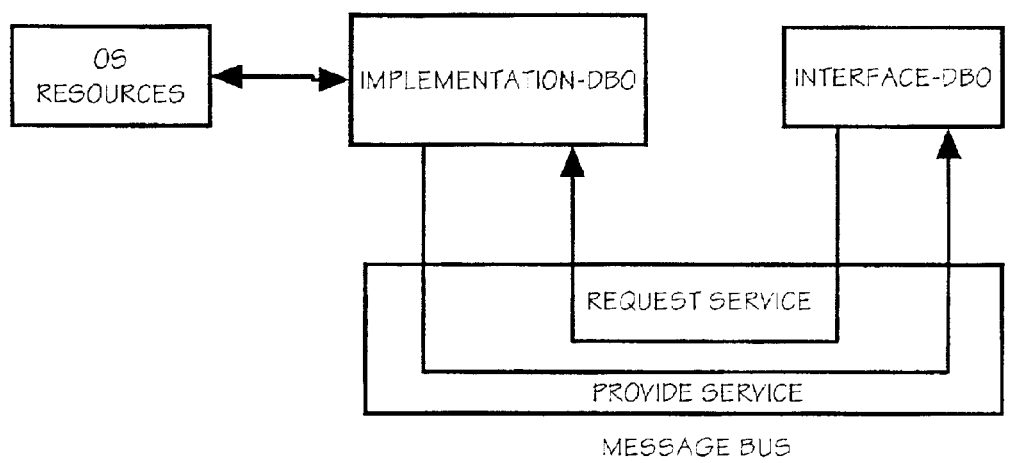
FIG. 4 is a block diagram illustrating the relationship between both implementation-dynamic-base-objects (hereinafter "implementation-DBO") and interface-dynamic-base-objects (hereinafter "interface-DBO") operating within the language neutral architecture of the scalable, distributed network of the present invention.
Figure 5:
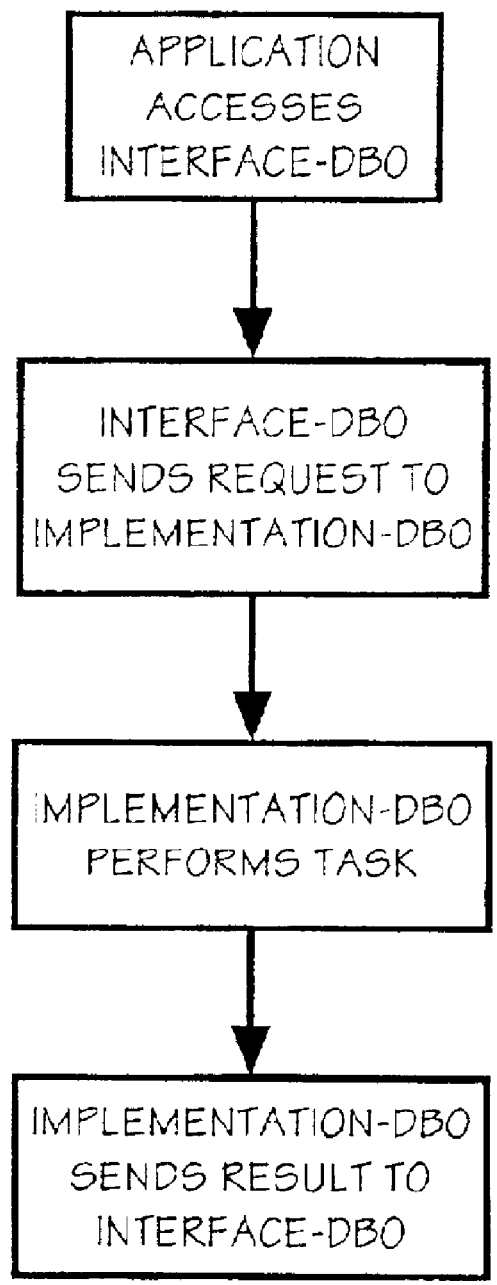
FIG. 5 is a flow diagram illustrating the operation of interface-DBOs and implementation-DBOs for providing architecture features and capabilities within the architecture of the scalable, distributed network of the present invention.

In an exemplary embodiment of the architecture of the present invention, when an application creates a DBO, two DBOs are actually created. These two DBOs are an interface-DBO within the application, and an instance of the real DBO (a/k/a an implementation-DBO). This relationship is best illustrated in FIG. 4. In a preferred embodiment of the invention, each time the application uses the interface-DBO, a message is sent to the implementation-DBO, which carries out the task and returns the result, as shown in FIG. 5. When the application frees the DBO the reverse happens. The implementation-DBO gets a message call to de-allocate its resources and terminate.

In an exemplary embodiment of the present invention the hierarchy of the present invention allows the polymorphic and inheritance features of object oriented programming to be more fully realized. For example, in the present invention polymorphism (which allows a routine in a derived class to be redefined), and inheritance (which allows for the derivation of desired characteristics within a subclass) operate to produce object construction, implementation, and utilization without centralized control, i.e., the object hierarchy of the objects of the present invention manage object construction, implementation, and utilization.

A DBO may be either memory or disk resident. A DBO required for execution is loaded from disk if not present in memory. In a preferred embodiment, DBOs have the following "behavioral" characteristics: (1) capability or feature may be dynamically created, added and changed; (2) other objects including other DBOs may provide a DBO with additional capabilities or features; (3) self checking mechanism with dynamic re-start and re-initialization upon runtime or like failure (4) standardized communication and services interface (e.g., object-to-object, user-to-object, and object-to-user); and (5) fully thread-safe.

The Architecture Administrator

Figure 6A:
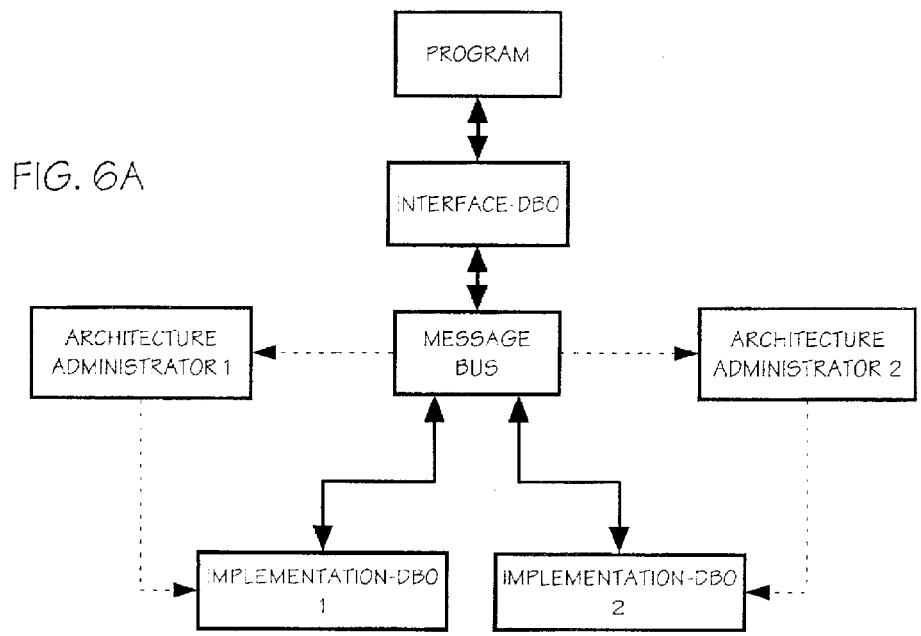
FIG. 6A is a block diagram illustrating architecture administrator (AA) control over the creation and utilization of implementation-DBOs for providing architecture features and capabilities within the architecture of the scalable, distributed network of the present invention.
Figure 6B:
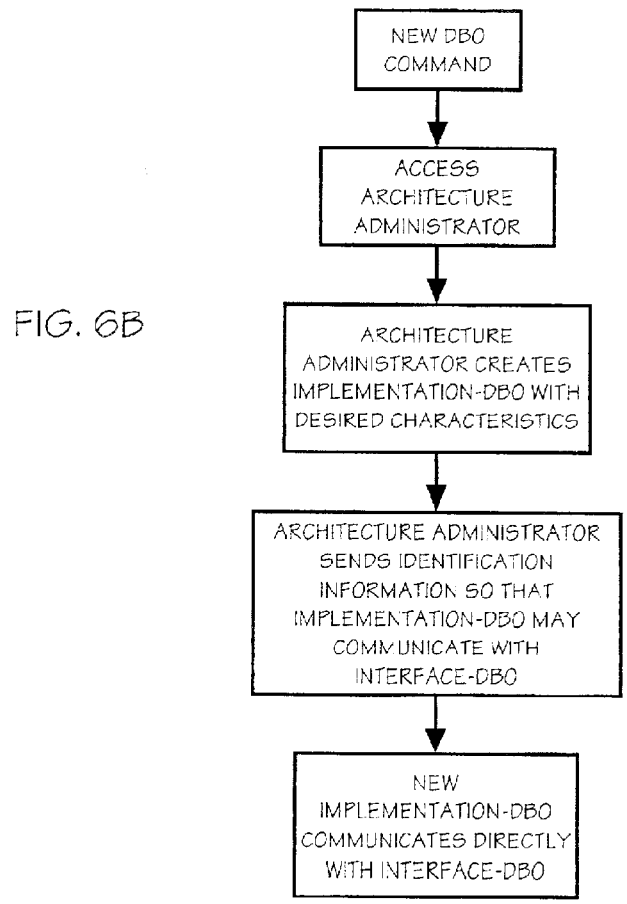
FIG. 6B is a flow diagram illustrating architecture administrator (AA) control over the creation and utilization of implementation-DBOs for providing architecture features and capabilities within the architecture of the scalable, distributed network of the present invention.

In an exemplary embodiment of the architecture of the present invention when an application creates a DBO, two DBOs are actually created (FIGS. 6A and 6B). These two DBOs are an interface-DBO within the application, and an instance of the real DBO (a/k/a an implementation-DBO). This relationship is best illustrated in FIG. 4. For example the application may create a DBO:

DynamicObject *pDObj=new DynamicObject;

The "new" call issues a message call to the architecture administrator (AA), which creates a new DBO with the desired characteristics. The object (DBO) created by the AA also contains the implementation. The AA then replies with "identification information" to the implementation-DBO, such that the interface-DBO and DBO (implementation-DBO) may communicate (FIGS. 6A and 6B).

Figure 7:
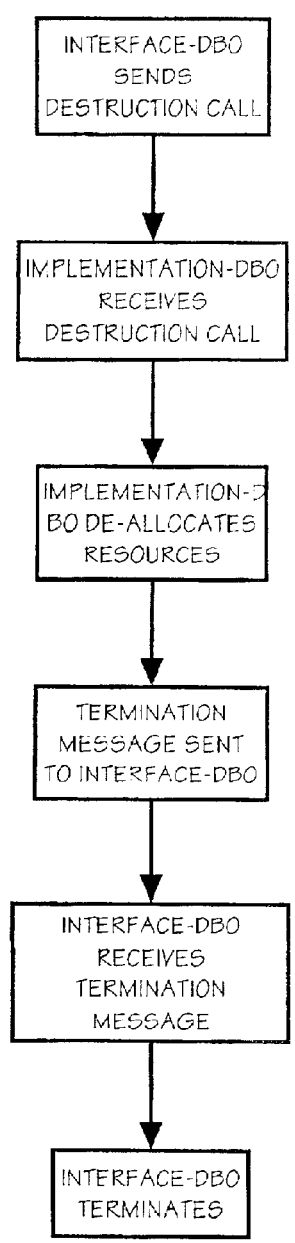
FIG. 7 is a flow diagram illustrating resource reallocation and DBO termination within the architecture of the scalable, distributed network of the present invention.
Figure 8:
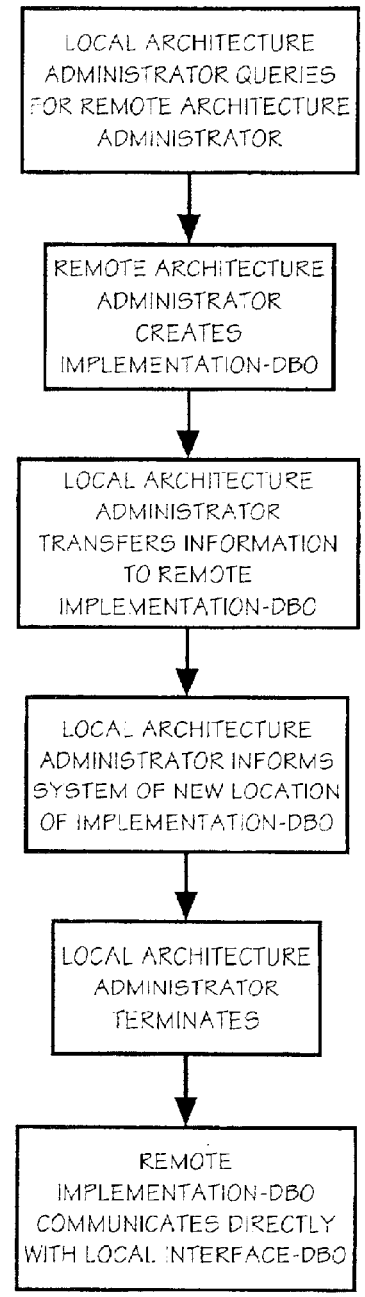
FIG. 8 is a flow diagram illustrating communication between a remote implementation-DBO and a local interface-DBO for providing architecture features and capabilities within the architecture of the scalable, distributed network of the present invention.

In a preferred embodiment of the invention, each time the application uses the interface-DBO, a message is sent to the implementation-DBO, which carries out the task and returns the result. When the application frees the DBO the reverse happens. The implementation-DBO gets a message call to de-allocate its resources and terminate. When the interfaced object (IO) receives the termination reply it can then safely terminate as well (FIG. 7).

Thus, the AA serves as the central "launch point" ("dispatcher") for DBOs. While the AA controls launch of DBOs, it is anticipated in a presently preferred embodiment, it will have no further involvement in DBO transactions. This is important, since to do otherwise introduces a "single-point-of-failure" in the system.

When the AA creates a new DBO it may involve loading a disk-based object. The implementation-DBO will often use resources and application programming interfaces ("APIs") provided by the underlying operating system ("OS"). Such OS resource will often be provided through shared libraries.

This architecture has a number of significant advantages:

1. The application does not embed any knowledge of the DBO; only the interface. This allows DBOs to be updated on "the-fly" such that a DBO may automatically have an application take advantage of the update.
2. The "message bus" can be either interprocess communication ("IPC") within one system or "over the network" for two separate systems (FIG. 8).
3. The application does not need to have direct access to the resources needed to run a particular DBO. This allows for "very thin" network appliances (e.g., where the appliance has little RAM and/or ROM) (FIG. 8).
4. If the DBO is a transaction object, the implementation object may issue another network call to a service provider (e.g., a DBO service provider or DBOSP) with the particulars of the transaction.
5. The AA is involved in creating the implementation object. All further communication happens directly between the interface object and the implementation object (FIGS. 6A and 6B).

DBO Methods

The interface and implementation-DBOs preferably vary in their implementation. Preferably the interface DBO will be implemented as a pure message pass. For example, in a simple function called "ADD" which adds to two integer values and returns the sum:

Interface DynamicObject:

```
Int  DynamicObject: :Add(int a, int b)
{
    int    sum;
    string s1 = Encode (a);
    string s2 = Encode (b);
    string reply;
    send_message (gpid_implementation_object,
    dynamic.dynamicobject.add, s1+s2, reply);
    sum = DecodeInt (reply);
    return sum;
}
```

For the implementation object, its min event loop would receive the message and call a function matching the "dynamic.dynamicobject.add" identifier.

Implementation DynamicObject:

```
Int  implementation_add (string msg, string answer)
{
    // Extract values from msg
    int  a=DecodeInt (msg);
    int  b=DecodeInt (msg[4]);
    int  sum = a+b;
    answer = Encode (sum);
}
```

From the applications view, life is significantly simpler. Assuming that the application has a function called "SomeFunction( )", it would proceed as follows to use the DynamicObject based Add method implemented herein before:

```
Void    SomeFunction( )
{
    DynamicObject    A;
    Int              sum;
    Sum – A.Add (1, 2);
}
```

While more direct methods of addition are available the example string provided several advantages transparently to the application:

1. The calculation is redirected to be performed outside the application (FIG. 8).
2. The redirection may include a network jump, i.e., the implementation may have been running on a different computer.
3. The implementation is shielded from the application, and as long as the results stay the same, the implementation may be changed, optimized and updated without application concern.

DBO Examples

Figure 9:
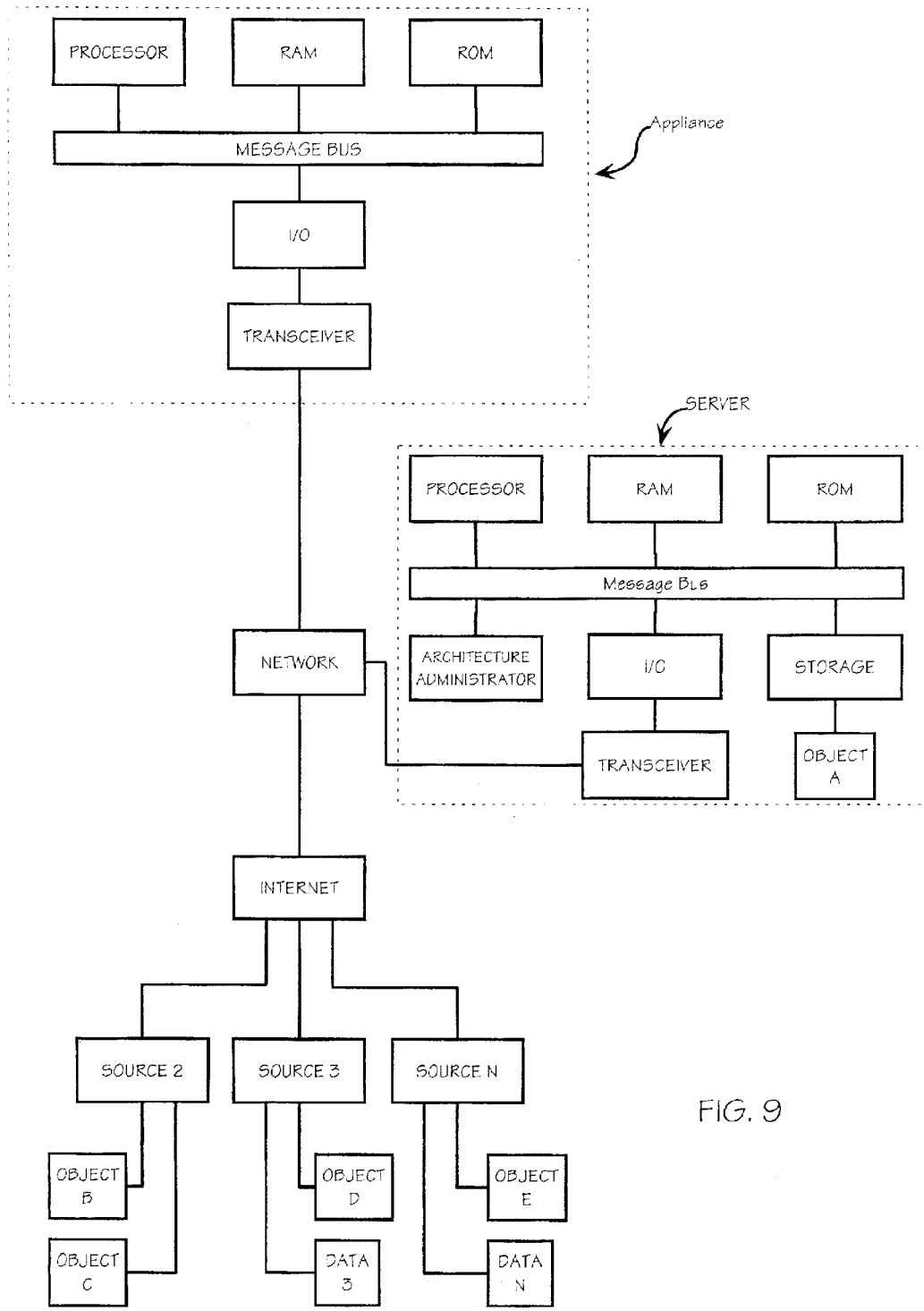
FIG. 9 is a block diagram illustrating scalable resource sharing between, for example, a "thin" information appliance within the architecture of the scalable, distributed network of the present invention.

The following examples are provided to those of ordinary skill to further illustrate the power and adaptability of the architecture of the present invention:

1. We want to log onto a network. The logon object encrypts our password, negotiates with the server and finally authenticates our account. It returns with an "OK" signal, that we are now ready to use network resources.
2. We want to watch a pay-per-view movie. The LogOn object works as in 1, the Billing and Logging objects connects and notifies the content provider (e.g., cable, theater, or movie company) we have an account.
3. We want to surf the network with our PDA. We load a browser object. Since we only have 1 MB of RAM on our system, the browser object connects to the Netscape browser already running on our PC. Through the transparent networking capabilities of the DBO it seems to us as if the browser is running on the PDA even though its really running on the PC (FIG. 9). This may allow the storage of account, billing, registration information, and the like seamlessly across the network.

Transparent Relocation of DBOs

The interface-DBO serves only as an interface; it contains no state information. Whereas an implementation-DBO contains all state and execution information. Thus, all execution and state information is localized. This total encapsulation allows relocating the execution of a DBO to another system.

Figure 10:
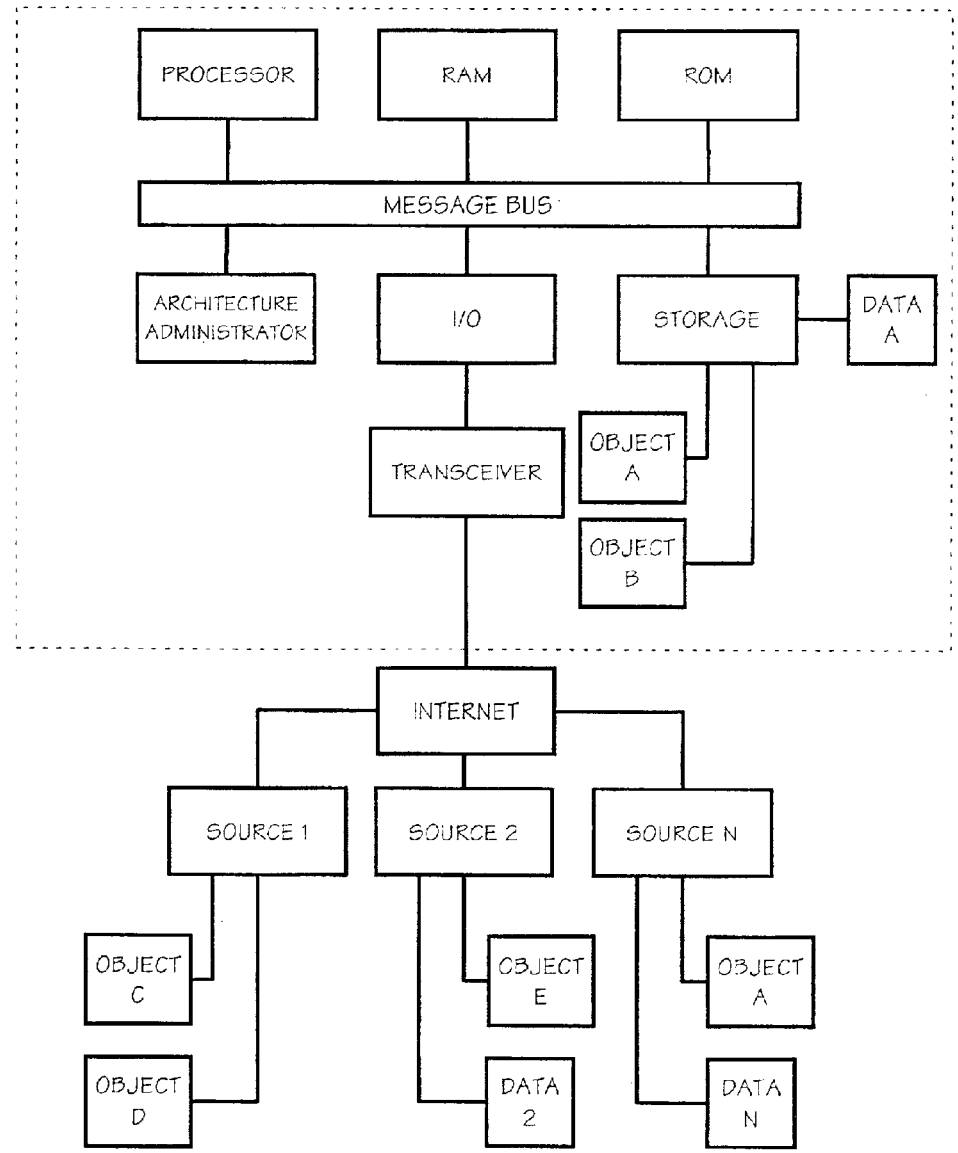
FIG. 10 is a block diagram illustrating scalable resource sharing between, for example, an information appliance within the architecture of the scalable, distributed network of the present invention.

In an exemplary embodiment of the architecture of the invention a local AA may request a remote AA (i.e. running on a different computer) to create an instance of the implementation object, transfer the state and execution information to the remote system, inform the interface of the next server, and terminate itself. Thus, the interface object is not necessarily connected to an implementation object running on a different computer (FIG. 10).

The Architecture Orchestrator and Scriptor

DBOs may be programmed in at least two different ways: (1) with compiled code, as shown herein before; or (2) through scripting language with run-time object invocation. Since DBOs may declare their capabilities at runtime, this allows for dynamic run-time execution of DBOs. An orchestrator or language processor may provide dynamic identification of all methods and properties of all DBOs. The Orchestrator may automatically support any DBO loaded on the system. The Orchestrator may also work with the AA to identify available DBOs and load and execute them as necessary. The Scriptor may be a few lines or a complete application.

Most Script programs will likely be short and tend to focus on the creation and interaction of a modest number of DBOs; for example, small animations, user interface elements and virtual appliances. There are, however, with JAVA® no limitations on the complexity of the Scripts which may employed. The Scriptor is both OS and processor independent. This provides a simple, consistent way to program at both the user-level through the Scriptor and at a program level through DBO interfaces. For example, to spin an object on a desktop, the Scriptor could be as follows:

//—Rotate an object around (0, 0, 0) in its local coordinates
// Until the user clicks on it with a mouse
DynamicObject Icon=FindDynamicObject ("demoobject");
Icon.Rotate (10, 10, 10, on_desktop, WAIT_EVENT);

The two lines do the following: the first line instructs the Orchestrator to find the object, the second line sets the rotation parameters and tells the system to let it run on the desktop (as opposed to its own window), and instructs the object to continue until it receives an external event. If the Rotate method had the last parameter as NULL or equivalent, it would just rotate once and return to the Scriptor; instead it launches a new process and then returns.

The following novel features may be operated using the environment described herein and in particular using the exemplary object based environment.

Execution Environment

Figure 11:
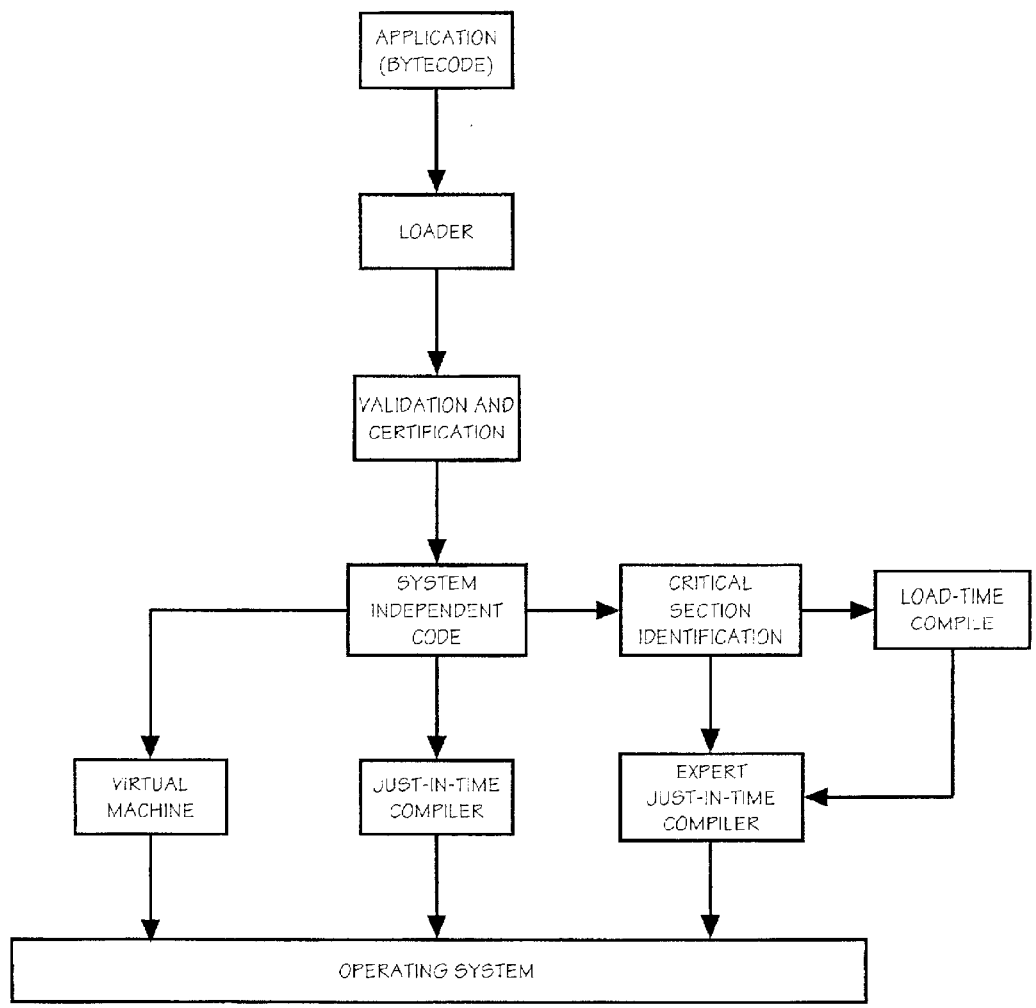
FIG. 11 is a block diagram illustrating a software execution model of the architecture of the scalable, distributed network of the present invention.

Referring now to FIG. 11, the architecture and execution model of the present invention provides system independent execution of applications. In this manner, an application may run on multiple platforms even though the platforms may have different processors, different memory subsystems, different graphics subsystems, and the like. In FIG. 11, an application is shown as being encoded in byte-code. Byte-code refers to an encoding of application source code into a processor independent intermediate code form produced by a compiler. This encoding is in an abstract, processor-independent form that cannot be directly executed by most processing systems but is highly suitable for further analysis (e.g., compiler optimization), for processing by interpreters, or for use in generation of binary instruction for an appliance's processing system. It should be appreciated that the "byte-code" nomenclature is not meant to imply a Java byte-code, but refers only to a byte-order independent processor description. The application is then loaded into memory by a loader.

Figure 12:
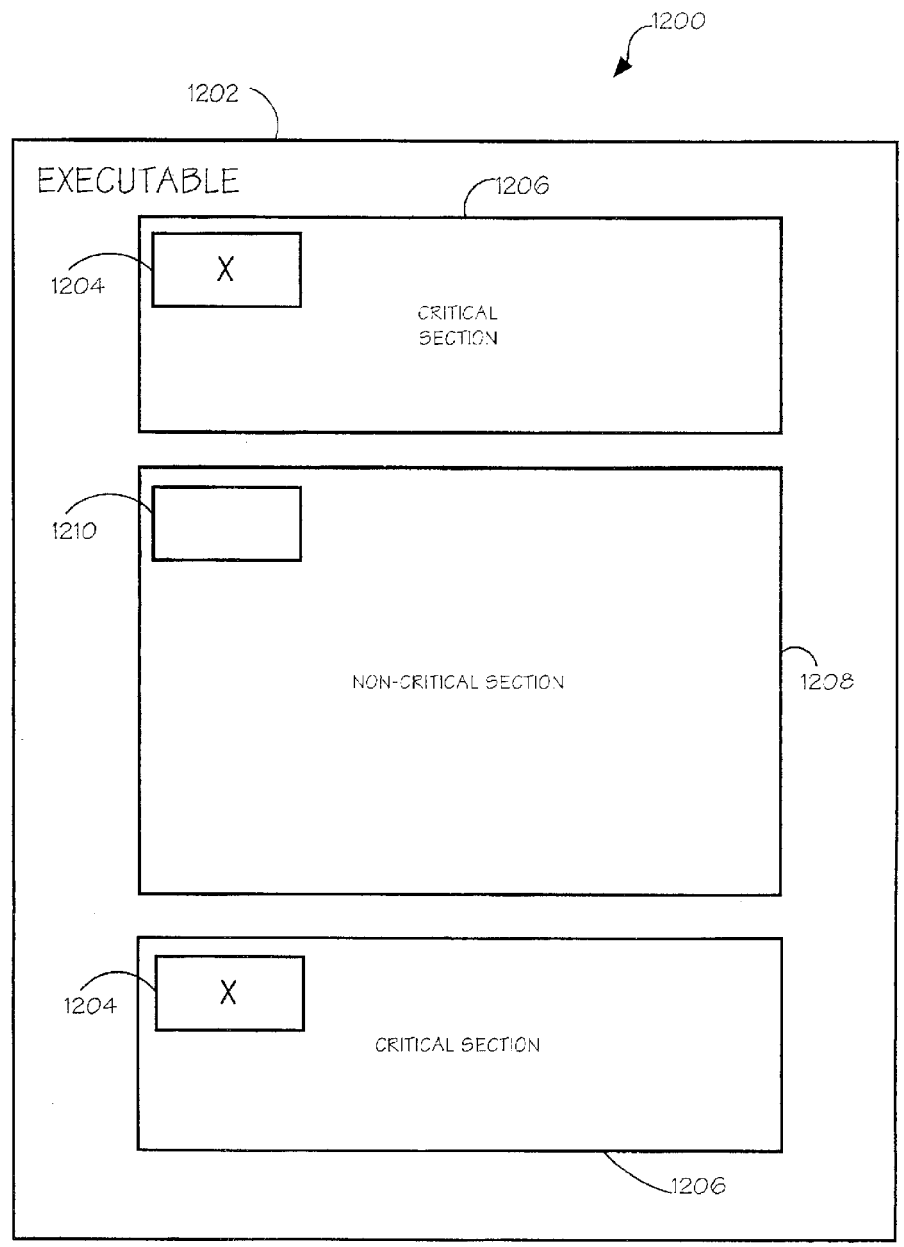
FIG. 12 is a block diagram illustrating an exemplary embodiment of a tagged string or module format in the execution environment of the architecture of the present invention.

The application is then validated and certified by a validation and certification utility to ensure that the application complies with the standard definition of the programming language. The architecture includes a loader with the ability to interpret, just-in-time compile, or pre-compile. The execution model also provides a mechanism to ensure near-optimal execution performance by incorporating a dynamic "critical section" load-time compiler within the execution environment. An application 1200 can "mark" or tag key sections in the system independent executable code 1202 (executable) that are performance sensitive. A diagram representing an exemplary marked file format allowing the load time compiler to identify critical sections for one-time compiles is shown in FIG. 12. The marked 1204 sections 1206 (FIG. 12) are identified by a critical section identification utility to be pre-compiled at load time and non-critical sections 1208 which are not identified 1210 may be compiled later. This enables the expert execution engine to call pre-compiled critical sections without the overhead of the JIT compile. Where the entire executable is marked as critical, the entire application will be compiled at load-time. This provides complete (100%) native performance; but may give the perception of slow load times. This perception can be obviated by storing compiled executables in persistent storage. Further, since the JIT compiler is executing natively compiled code, there will be no overhead of "calling out of the environment into the operating system (OS)".

Figure 13:
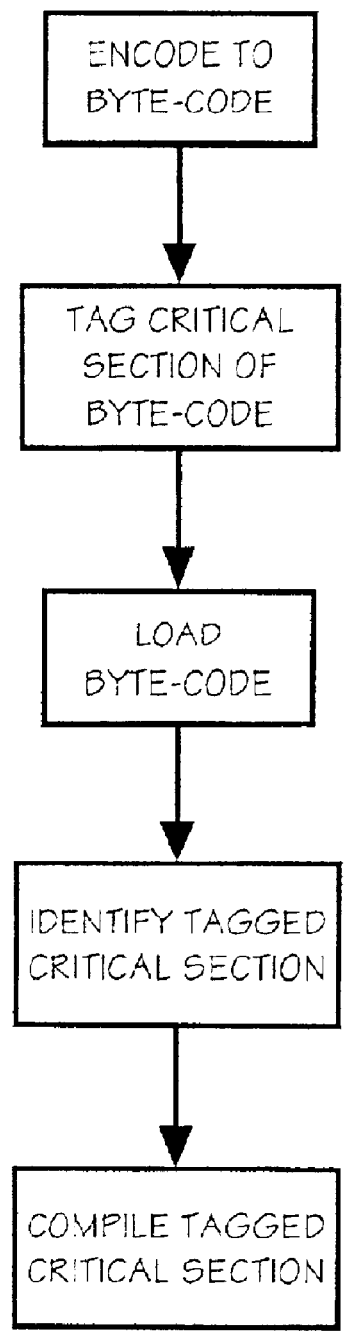
FIG. 13 is a flow diagram of an exemplary embodiment of the present invention wherein a dynamic section compiler is utilized in an object programming environment.

Referring now to FIG. 13, an exemplary embodiment of the present invention is shown wherein a critical section compiler is utilized in an object programming environment. Source code is encoded to byte-code, which includes encoding of application source code into a processor independent intermediate code form produced by a compiler. Critical sections of the byte-code are tagged for being pre-compiled at load time. Therefore, once the byte-code is loaded by a digital information appliance, the tagged critical sections of the byte-code may be identified by the digital information appliance to be pre-compiled at load time. Thus, when utilized in an object oriented architecture, critical portions of objects may be pre-loaded by the digital information appliance to increase the efficiency of accessing the object when needed. For example, a user may request a task which requires a specific resource, such as a particular dynamic base object, to be performed by a digital information appliance that is not currently accessible by the digital information appliance. The digital information appliance, utilizing an architecture administrator may locate and/or create the specified dynamic base object, such as loading a stored dynamic base object on the digital information appliance or accessing the dynamic base object over a network. Portions of the dynamic base object may be pre-compiled utilizing the present method to enable the dynamic base object to be run and accessed more efficiently.

Thus, there has been described an object driven software architecture and several process features which together provide for at least all of the advantages stated herein. Although the invention has been described with a certain degree of particularity, it should be recognized that elements thereof may be altered by persons skilled in the art without departing from the spirit and scope of the invention. It is believed that the system and method for just-in-time compiling of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for dynamic compiling, comprising:
  loading byte-code on a digital information appliance, said byte-code suitable for including a tagged section;
  identifying the tagged section of the byte-code; and
  compiling the tagged section of byte-code;
  wherein the tagged section is compiled when the byte-code is loaded so as to enable the digital information appliance to utilize the tagged section of byte-code without additional compiling of the tagged section of byte-code by the digital information appliance,
  wherein the byte-code includes at least one dynamic base object, the at least one dynamic base object having a self-checking mechanism with dynamic re-start and re-initialization upon run-time or like failure, the dynamic base object further having a standardized communication and services interface, the at least one dynamic base object comprising an interface dynamic base object and an implementation dynamic base object that communicate with each other over a message bus, the interface dynamic base object utilized by an application to send a message to the implementation dynamic base object to carry out a requested task, the implementation dynamic base object carrying out the requested task and returning a result to the interface dynamic base object.

2. The method as described in claim 1, further comprising:
encoding application source code to byte-code, the byte-code including code in a processor-independent form which is suitable for further analysis; and
tagging a section of the byte-code.

3. The method as described in claim 2, wherein the byte-code including code in the processor-independent form is suitable for further analysis including at least one of suitable for compiler optimization, suitable for processing by interpreters, and suitable for use in generation of binary instruction for the digital information appliance processing system.

4. The method as described in claim 2, wherein the section of the byte-code is tagged for being performance sensitive.

5. The method as described in claim 1, further comprising storing the compiled tagged section of byte-code in persistent storage.

6. The method as described in claim 1, wherein loading includes validating that the byte-code conforms with byte-code suitable for utilization by the digital information appliance.

7. The method of claim 1, wherein the message bus provides interprocessor communications within a system.

8. The method of claim 1, wherein the message bus provides communications over the network.

9. The method of claim 1, wherein the byte-code is processor independent.

10. The method of claim 1, wherein the dynamic base object is programmed through a scripting language with run-time object invocation.

11. The method of claim 1, wherein the interface dynamic base object and the implementation dynamic base object communicate bi-directionally.

12. The method of claim 1, wherein the interface dynamic base object includes multiple lines of code.

13. The method of claim 1, wherein the digital information appliance is a thin network appliance.

14. The method of claim 1, wherein the at least one dynamic base object is fully thread safe.

15. A digital information appliance suitable for dynamic coupling, comprising:
a processor for implementing a program of instructions; and
a memory for storing the program of instructions, the program of instructions suitable for configuring the digital information appliance to load byte-code, said byte-code suitable for including a tagged section;
identify the tagged section of the byte-code; and
compile the tagged section of byte-code;
wherein the tagged section is compiled when the byte-code is loaded so as to enable the digital information appliance to utilize the tagged section of byte-code without additional compiling of the tagged section of byte-code by the digital information appliance,
wherein the byte-code includes at least one dynamic base object, the at least one dynamic base object having a self-checking mechanism with dynamic re-start and re-initialization upon run-time or like failure, the dynamic base object further having a standardized communication and services interface, the at least one dynamic base object comprising an interface dynamic base object and an implementation dynamic base object that communicate with each other over a message bus, the interface dynamic base object utilized by an application to send a message to the implementation dynamic base object to carry out a requested task, the implementation dynamic base object carrying out the requested task and returning a result to the interface dynamic base object.

16. The digital information appliance as described in claim 15, further comprising:
encoding application source code to byte-code, the byte-code including code in a processor-independent form which is suitable for further analysis; and
tagging a section of the byte-code.

17. The digital information appliance as described in claim 16, wherein the byte-code including code in the processor-independent form is suitable for further analysis including at least one of suitable for compiler optimization, suitable for processing by interpreters, and suitable for use in generation of binary instruction for a digital information appliance's processing system.

18. The digital information appliance as described in claim 15, wherein the section of the byte-code is tagged for being performance sensitive.

19. The digital information appliance as described in claim 15, further comprising storing the compiled tagged section of byte-code in persistent storage.

20. The digital information appliance as described in claim 15, wherein loading includes validating that the byte-code conforms with byte-code suitable for utilization by the digital information appliance.

21. The method of claim 15, wherein the message bus provides interprocessor communications within a system.

22. The method of claim 15, wherein the message bus provides communications over the network.

23. The method of claim 15, wherein the byte-code is processor independent.

24. The method of claim 15, wherein the dynamic base object is programmed through a scripting language with run-time object invocation.

25. The method of claim 15, wherein the interface dynamic base object and the implementation dynamic base object communicate bi-directionally.

26. A system for providing an execution environment that is suitable for dynamic compiling, comprising:
a memory device suitable for storing computer readable information;
a loader coupled to the memory device, the loader suitable for loading byte-code to the memory, said byte-code suitable for including a tagged section, the loader being capable of interpreting, just in time compiling, and pre-compiling;
an identifier coupled to the loader, the identifier suitable for identifying the tagged section of the byte-code;
a compiler coupled to the identifier;
wherein the identified tagged section is compiled by the compiler when the byte-code is loaded so as to enable the tagged section of byte-code to be utilized without additional compiling of the tagged section of byte-code;

wherein the byte-code includes at least one dynamic base object, the at least one dynamic base object having a self-checking mechanism with dynamic re-start and re-initialization upon run-time or like failure, the dynamic base object further having a standardized communication and services interface, the at least one dynamic base object comprising an interface dynamic base object and an implementation dynamic base object that communicate with each other over a message bus, the interface dynamic base object utilized by an application to send a message to the implementation dynamic base object to carry out a requested task, the implementation dynamic base object carrying out the requested task and returning a result to the interface dynamic base object.

27. The system as described in claim 26, further comprising:

an encoder for encoding application source code to byte-code, the byte-code including code in a processor-independent form which is suitable for further analysis; and a tagger for tagging a section of the byte-code.

28. The system as described in claim 27, wherein the byte-code including code in the processor-independent form is suitable for further analysis including at least one of suitable for compiler optimization, suitable for processing by an interpreter, and suitable for use in generation of binary instruction for a processing system.

29. The system as described in claim 27, wherein the section of the byte-code is tagged for being performance sensitive.

30. The system as described in claim 26, wherein the loader includes a validation utility for validating the byte-code conforms with byte-code suitable for utilization by the system.

31. The system of claim 26, wherein the message bus provides interprocessor communications within a system.

32. The system of claim 26, wherein the message bus provides communications over the network.

33. The system of claim 26, wherein the interface dynamic base object and the implementation dynamic base object communicate bi-directionally.

34. The system of claim 26, wherein the byte-code is processor independent.

35. The system of claim 26, wherein the dynamic base object is programmed through a scripting language with run-time object invocation.

36. A method for providing an execution environment in an information appliance network, comprising:

a) encoding an application source code in a processor independent byte-code;

b) tagging at least some portion of said processor independent byte-code; and c) compiling at least some portion of said tagged processor independent byte-code, wherein the byte-code includes at least one dynamic base object, the at least one dynamic base object having a self-checking mechanism with dynamic re-start and re-initialization upon run-time or like failure, the dynamic base object further having a standardized communication and services interface, the at least one dynamic base object comprising an interface dynamic base object and an implementation dynamic base object that communicate with each other over a message bus, the interface dynamic base object utilized by an application to send a message to the implementation dynamic base object to carry out a requested task, the implementation dynamic base object carrying out the requested task and returning a result to the interface dynamic base object.

37. The execution environment for an information appliance network of claim 36, further including validating at least some portion of said processor independent byte-code.

38. The execution environment for an information appliance network of claim 36, wherein compiling includes identifying the portion of said tagged processor independent byte-code.

39. The method of claim 36, wherein the message bus provides interprocessor communications within a system.

40. The method of claim 36, wherein the message bus provides communications over the network.

41. The method of claim 36, wherein the independent byte-code is processor independent.

42. The method of claim 36, wherein the dynamic base object is programmed through a scripting language with run-time object invocation.

43. The method of claim 36, wherein the interface dynamic base object and the implementation dynamic base object communicate bi-directionally.

* * * * *